(12) United States Patent
Skarpness

(10) Patent No.: US 6,892,243 B1
(45) Date of Patent: May 10, 2005

(54) PRIORITIZING DATA TRANSFERS OVER DATA BUSES

(75) Inventor: Mark L. Skarpness, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/469,960

(22) Filed: Dec. 21, 1999

(51) Int. Cl.$^7$ ............................................. G06F 15/16
(52) U.S. Cl. ..................................................... 709/234
(58) Field of Search ................................. 709/234, 253; 710/52, 55, 58; 370/463, 412

(56) References Cited

U.S. PATENT DOCUMENTS

| | | | | |
|---|---|---|---|---|
| 4,521,882 A | * | 6/1985 | Gabrielli et al. | 370/445 |
| 5,941,952 A | * | 8/1999 | Thomas et al. | 709/234 |
| 6,088,734 A | * | 7/2000 | Marin et al. | 709/232 |
| 6,205,150 B1 | * | 3/2001 | Ruszczyk | 370/412 |
| 6,212,582 B1 | * | 4/2001 | Chong et al. | 710/57 |
| 6,247,058 B1 | * | 6/2001 | Miller et al. | 709/234 |
| 6,289,389 B1 | * | 9/2001 | Kikinis | 709/239 |
| 6,401,147 B1 | * | 6/2002 | Sang et al. | 710/56 |
| 6,427,173 B1 | * | 7/2002 | Boucher et al. | 709/238 |
| 6,466,579 B1 | * | 10/2002 | Scott et al. | 370/395.71 |
| 6,470,410 B1 | * | 10/2002 | Gulick et al. | 710/305 |
| 6,473,815 B1 | * | 10/2002 | Lu et al. | 710/52 |
| 6,480,911 B1 | * | 11/2002 | Lu | 710/57 |
| 6,519,666 B1 | * | 2/2003 | Azevedo et al. | 710/120 |
| 6,629,220 B1 | * | 9/2003 | Dyer | 711/158 |
| 6,678,280 B1 | * | 1/2004 | Kim et al. | 370/429 |
| 6,680,906 B1 | * | 1/2004 | Nguyen | 370/229 |

OTHER PUBLICATIONS

RFC 2212 entitled "Specification of Guaranteed Quality of Service", by S. Shenker et al., Sep. 1997.*

* cited by examiner

*Primary Examiner*—Jack B. Harvey
*Assistant Examiner*—Douglas Blair
(74) *Attorney, Agent, or Firm*—Fish & Richardson P.C.

(57) ABSTRACT

A computer system includes a host processor and a peripheral device coupled by an attachment bus. The peripheral device transfers data to the host processor over the attachment bus using at least two types of data transfers. The peripheral device includes a classifying circuit that separates the data into a first class associated with a first type of transfer and a second class associated with a second type of transfer. The peripheral circuit also includes two queues, including a first queue that receives the first class of data from the classifying circuit and a second queue that receives the second class of data from the classifying circuit. A control circuit places data from the first queue onto the bus at a higher priority than data from the second queue is placed onto the bus.

18 Claims, 2 Drawing Sheets

PRIORITIZING DATA TRANSFERS OVER DATA BUSES

TECHNOLOGICAL FIELD

This application relates to data transfers on a data bus, such as the "Universal Serial Bus" (USB) found in many personal computer systems.

BACKGROUND

Data buses are used to transfer data between devices in computer systems. In general, a data bus can transfer only a certain amount of data in a given amount of time and thus has limited "bandwidth." Some data buses, such as a "Universal Serial Bus" (USB), support more than one type of data transfer, each with its own bandwidth and priority requirements. USB, for example, supports two types of streaming transfers for bi-directional data, known as "isochronous" transfers and "bulk" transfers.

In the USB environment, isochronous transfers are used for higher priority data, such as packetized voice data, that must reach the intended target within a bounded period of time. Isochronous transfers therefore attempt to guarantee at least some minimum bandwidth on the bus. Bulk transfers, on the other hand, are used with lower priority data, such as normal Internet traffic, for which only a guarantee of delivery is required. Bulk transfers do not guarantee bandwidth or priority on the bus.

In a conventional computer system, each network-interfacing device places all traffic that arrives over the network into a single queue. For a USB device, such as a USB broadband modem, this means that all incoming data is placed in a single queue, regardless of the data's priority. Therefore, the delivery of higher priority data is often delayed by the presence of lower priority data in the queue. This makes it difficult to provide guaranteed bus bandwidth to the higher priority data.

SUMMARY

A computer system includes a host processor and a peripheral device coupled by an attachment bus. The peripheral device transfers data to the host processor over the attachment bus using at least two types of data transfers. The peripheral device includes a classifying circuit that separates the data into a first class associated with a first type of transfer and a second class associated with a second type of transfer. The peripheral circuit also includes two queues, including a first queue that receives the first class of data from the classifying circuit and a second queue that receives the second class of data from the classifying circuit. A control circuit places data from the first queue onto the bus with higher priority than data from the second queue is placed onto the bus.

Other embodiments and advantages will become apparent from the following description and from the claims.

DETAILED DESCRIPTION

Figure 1:
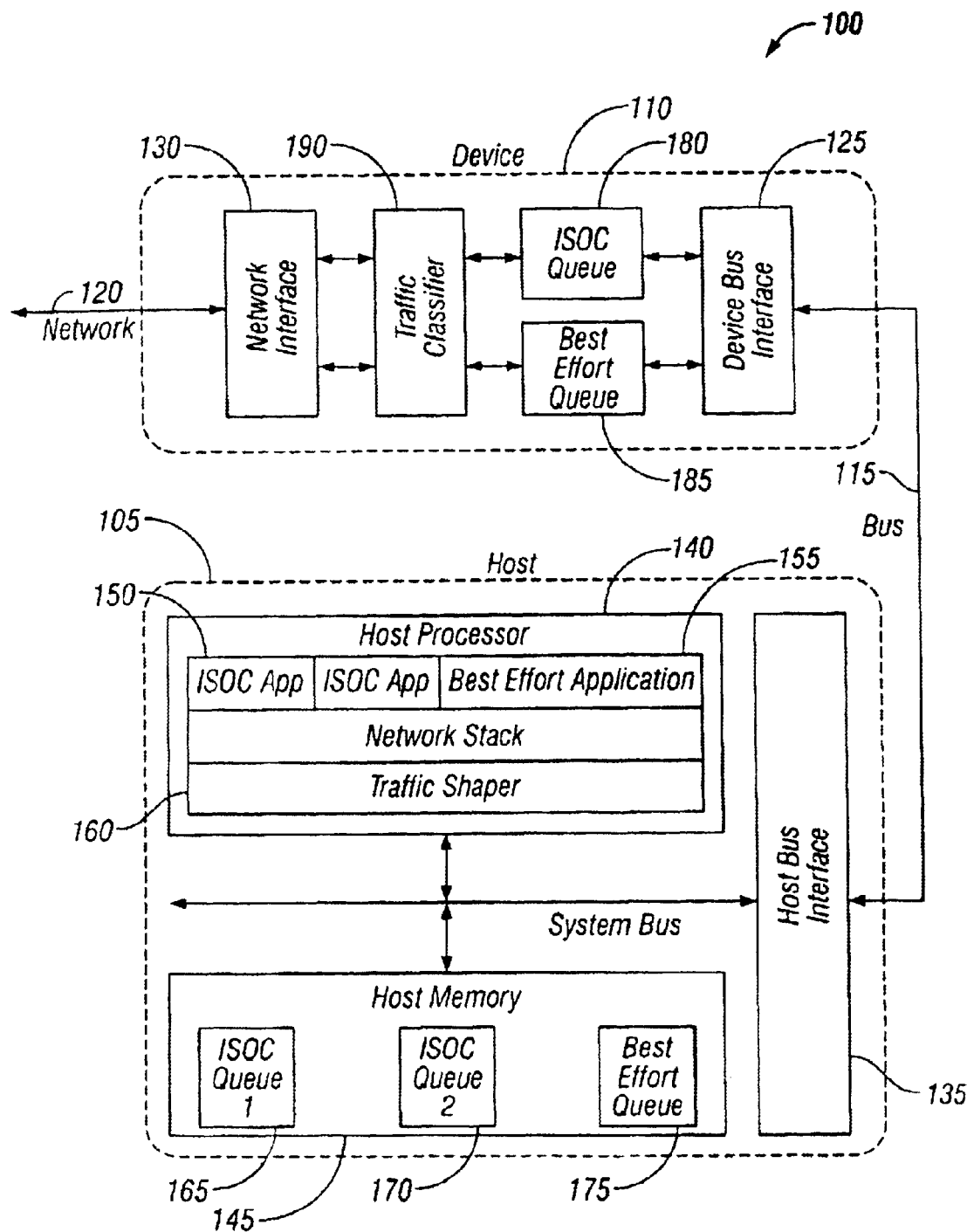
FIGS. 1 and 2 are partial block diagrams of a computer system that places incoming and outgoing network traffic into queues that indicate a priority level for each block of data.

FIG. 1 shows a computer system 100 in which a host device 105 communicates with a peripheral device 110, such as a broadband modem, over a bi-directional data bus 115, such as a "Universal Serial Bus" (USB) or a "Peripheral Component I.D Interface" (PCI) bus. The peripheral device 110 also connects to a computer network 120, such as the Internet or a private intranet. The peripheral device includes a device-bus interface component 125 that allows the device to send and receive data over the data bus 115. Likewise, the peripheral device 110 includes a network interface component 130 that allows the device to send and receive data over the network 120. The host device 105 includes a host-bus interface 135 that allows the host device 105 to send and receive data over the data bus 115.

Some of the data flowing through the peripheral device 110 has higher priority than other data flowing through the device and therefore must be handled more reliably. For example, packetized voice data must reach its intended target in a manner that has very little, if any, effect on the reproduced sound quality. Many types of Internet traffic, on the other hand, generally does not need to reach its intended target with any particular urgency.

When the data bus 115 is a USB bus, isochronous transfers, or "guaranteed service" transfers, are used to deliver higher priority data, such as packetized voice data, between the peripheral device 110 and the host processor. USB uses bulk transfers, or "best effort service" transfers, to deliver lower priority data, such as normal Internet traffic.

The host device 105 and the peripheral device 110 both include components that distinguish between higher priority data and lower priority data. These components ensure that the higher priority data is delivered with greater reliability.

The host device 105 typically includes the computer's base board, on which a host processor 140 and host memory device 145 reside. The host processor 140 executes a variety of application programs, including applications that require guaranteed service, such as packetized voice applications 150, and programs that require only best-effort service, such as Internet browsing applications 155. The host processor 140 also implements a traffic shaping component 160, which receives data addressed to the network and separates the data into higher priority and lower priority blocks. The host processor 140 implements the application programs 150, 155 and the traffic shaping component 160 by retrieving executable instructions from a storage device, such as the host memory device 145, and executing these instructions.

The host memory device 145 includes storage elements that are partitioned to form two or more data queues 165, 170, 175. At least one queue is a "highest priority" queue 165 dedicated to storing data generated by or intended for one of the higher priority applications 150, and at least one queue is a "low priority" queue 175 dedicated to storing data generated by or intended for the lower priority applications 155. In some embodiments, one queue is an "elevated priority" queue 170 dedicated to storing data that is high priority, but that is not as high priority as the data stored in the highest priority queue 165.

For example, in some embodiments the highest priority queue 165 stores data that must be delivered at a constant bit rate. This data requires the guarantee of a fixed bus bandwidth. The elevated priority queue 170 stores data that can be delivered at a variable, but bounded, bit rate. This data requires the guarantee of some minimum bus bandwidth. The low priority queue 175 stores data that can be delivered at an unspecified bit rate and thus requires no guarantee of bus bandwidth.

The peripheral device 110 also includes at least two queues, including a "higher priority" queue 180 that stores higher priority data and a "lower priority" queue 185 that stores lower priority data. Data flowing into the peripheral device 110 through the network interface component 120 passes through a traffic classifier component 190. This component separates the incoming data blocks into higher priority and lower priority streams and feeds the streams to the appropriate queues. The device-bus interface 125 places data from the queues 180, 185 onto the data bus 115 in a manner that honors the bandwidth and priority requirements of the data. In general, a minimum amount of data is pulled from the higher priority queue 180 during each time cycle of some predefined length.

Data flowing into the peripheral device through the device-bus interface 125 arrives from the host device 105. In some embodiments, the peripheral device includes another traffic classifier between the device-bus interface 125 and the queues 180, 185. In most embodiments, however, the host-bus interface 135 in the host device 105 produces a signal indicating the priority of each block of data, so a traffic classifier is not needed between the device-bus interface 125 and the queues 180, 185. The device-bus interface 125 simply directs the incoming data blocks to the appropriate queues based upon the content of this signal.

Figure 2:
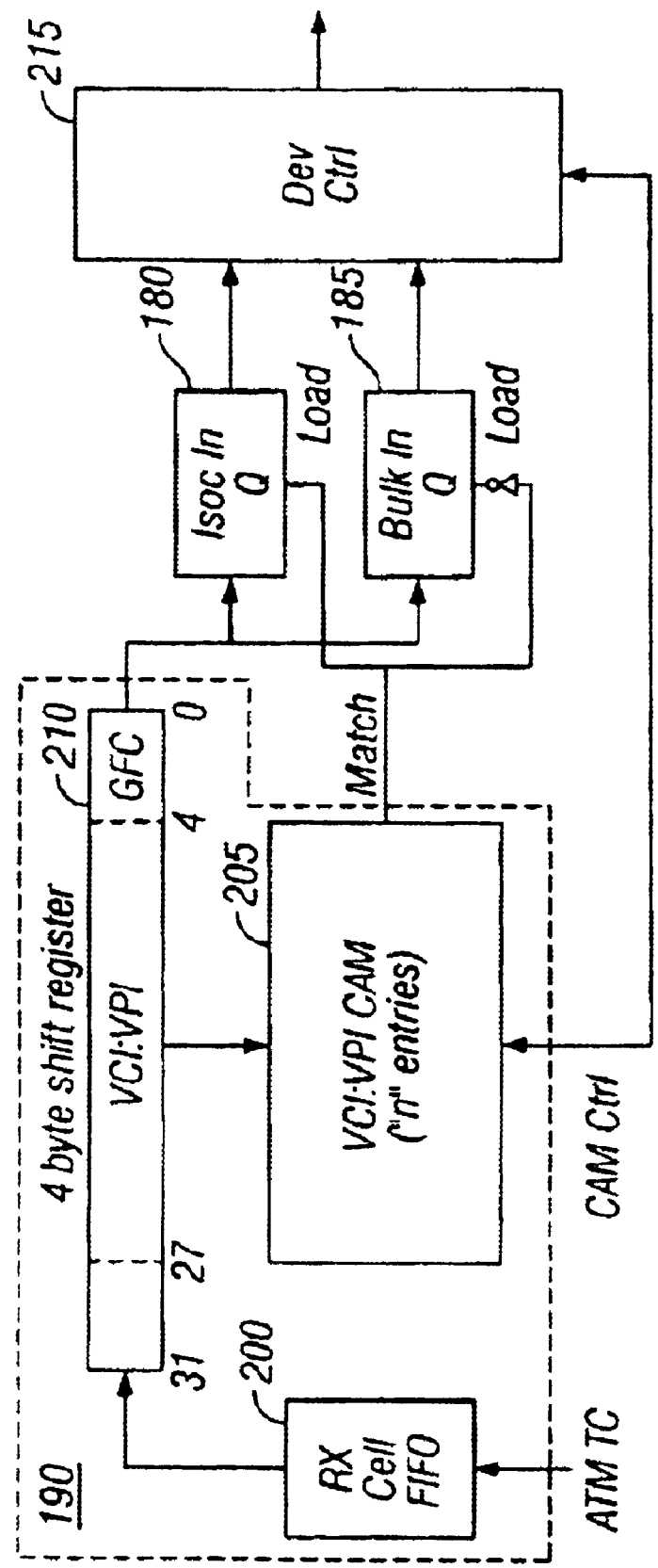

FIG. 2 shows one implementation of the traffic classifier component 190 in the peripheral device. This implementation is designed for use with an "Asynchronous Transfer Mode" (ATM) network and a "Universal Serial Bus" (USB).

Data arriving through the network interface component 130 (FIG. 1) enters a first-in-first-out (FIFO) buffer 200 that holds one data packet, or "cell." In an ATM environment, each cell includes 53 bytes of data arranged in a commonly-defined configuration. Of the 53 bytes in each cell, four bytes carry a header that, among other things, indicates the packet's virtual channel identifier and Virtual Path Identifier (VCI:VPI). The VCI:VPI typically occupies bits 4–27 in an ATM cell.

In general, all ATM data cells at a particular priority level are transferred over a known set of virtual channels. Therefore, the peripheral device can derive each cell's priority level based upon the VCI:VPI encoded in the cell's header. The priority level associated with each virtual channel is stored in a content addressable memory (CAM) device 205 in the peripheral device.

The FIFO buffer 200 transfers the incoming data, one bit at a time, into a four-byte shift register 210. Therefore, in an ATM environment, bits 4–27 in the shift register contain a VCI:VPI once every 53 bytes. The CAM device 205 is programmed to retrieve the VCI:VPI from each data packet by loading these 24 bits once every 53 bytes. Upon loading the VCI:VPI from a data packet, the CAM device 205 compares the packet's VCI:VPI to each of the stored VCI:VPI's that are associated with higher priority cells. If the packet's VCI:VPI matches one of the stored VCI:VPI's, the CAM device 205 enables the higher priority queue 180 and disables the lower priority queue 185, so the incoming packet is stored in the higher priority queue 180. If the packet's VCI:VPI does not match any of the stored VCI:VPI's, the CAM device enables the lower priority queue 185 and disables the higher priority queue 180, and the packet is stored in the lower priority queue 185.

A device controller 215 in the device-bus interface component 125 (FIG. 1) controls the flow of data from the queues 180, 185 to the data bus. The device controller 215 awards control of the USB to the higher priority queue 180 once each time cycle, e.g., once every millisecond. The device controller 215 awards control of the data bus to the lower priority queue 185 only when the bus is otherwise unoccupied. In this manner, the peripheral device guarantees that higher priority data is delivered at some minimum rate.

A number of embodiments of the invention are described above. A person of ordinary skill will recognize that various modifications are possible without departing from the spirit and scope of the invention. Accordingly, other embodiments are within the scope of the following claims.

What is claimed is:

1. A computer system comprising:
   a host processor;
   an attachment bus coupled to the host processor, the attachment bus being inside the computer system, the attachment bus being configured to receive data during time cycles of predetermined length;
   a peripheral device coupled to the host processor via the attachment bus, the peripheral device being configured to transfer data from a network to the host processor over the attachment bus inside the computer system using at least first and second types of data transfers, comprising:
   a classifying circuit configured to separate the data into a first class associated with the first type of transfer and a second class associated with the second type of transfer;
   a first queue connected to receive the first class of data from the classifying circuit;
   a second queue connected to receive the second class of data from the classifying circuit; and
   a control circuit configured to place data from the first queue onto the attachment bus at a higher priority than data from the second queue is placed onto the attachment bus;
   where the control circuit is configured to place at least a minimum amount of data from the first queue onto the attachment bus during each time cycle; where the control circuit is configured to place data from the second queue onto the attachment bus only when the attachment bus is otherwise unoccupied by first class data.

2. The system of claim 1, where the peripheral device includes a network interface component connected to receive the data from a computer network.

3. The system of claim 1, wherein the data includes packetized voice data.

4. The system of claim 1, where the peripheral device is configured to deliver the data in packets of predetermined length.

5. The system of claim 4, where the classifying circuit is configured to place each of the packets into one of the queues.

6. The system of claim 1, wherein the attachment bus is a Peripheral Component Interface (PCI) bus.

7. The system of claim 1, wherein the network is an Asynchronous Transfer Mode (ATM) network.

8. A computer system comprising:
   a host processor;
   an attachment bus coupled to the host processor, the attachment bus being inside the computer system;
   a peripheral device configured to receive asynchronous transfer mode (ATM) data packets from a network and transfer data to the host processor over the attachment bus inside the computer system using at least first and second types of data transfers, comprising:
   a classifying circuit configured to separate the data into a first class associated with the first type of transfer and a second class associated with the second type of transfer;

a first queue connected to receive the first class of data from the classifying circuit;

a second queue connected to receive the second class of data from the classifying circuit; and a control circuit configured to place data from the first queue onto the attachment bus at a higher priority than data from the second queue is placed onto the attachment bus;

where the attachment bus is a Universal Serial Bus (USB), and the first type of transfer associated with the first class of data is an isochronous transfer, and the second type of transfer associated with the second class of data is a bulk transfer.

9. A computer system comprising:

a host processor;

an attachment bus coupled to the host processor, the attachment bus being inside the computer system;

a peripheral device coupled to the host processor via the attachment bus, the peripheral device being configured to transfer data from a network to the host processor over the attachment bus inside the computer system using at least first and second types of data transfers, comprising:

a classifying circuit configured to separate the data into a first class associated with the first type of transfer and a second class associated with the second type of transfer;

a first queue-connected to receive the first class of data from the classifying circuit;

a second queue connected to receive the second class of data from the classifying circuit; and a control circuit configured to place data from the first queue onto the attachment bus at a higher priority than data from the second queue is placed onto the attachment bus;

where the attachment bus is configured to receive data during time cycles of predetermined length; where each packet includes a virtual channel identifier, and where the classifying circuit includes a storage device that stores a list of virtual channel identifiers that are associated with at least one of the classes.

10. The system of claim 9, where the classifying circuit includes a selection element configured to (a) compare the virtual channel identifier in the packet to the virtual channel identifiers stored in the storage device and (b) select a corresponding one of the queues to receive the packet.

11. The system of claim 9, where the classifying circuit comprises a buffer adapted to buffer a received packet, a shift register adapted to store a portion of the received packet, and the storage device is a content addressable memory (CAM) device adapted to store virtual channel identifiers that are associated with at least one of the classes.

12. A method comprising:

transferring data from a network to a host processor over an attachment bus inside the computer system using at least first and second types of data transfers and, in transferring the data:

separating the data into a first class associated with the first type of transfer and a second class associated with the second type of transfer;

placing data of the first class onto the attachment bus at a higher priority than data of the second class is placed onto the attachment bus;

placing data on the attachment bus during time cycles of predetermined length, where placing data of the first class on the attachment bus includes placing at least a minimum amount of data of the first class onto the attachment bus during each time cycle; and placing data of the second class onto the attachment bus only when the attachment bus is otherwise unoccupied by first class data.

13. The method of claim 12, further comprising receiving the data from a computer network.

14. The method of claim 12, where receiving the data includes receiving packetized voice data.

15. The method of claim 12, where transferring data includes delivering the data in packets of predetermined length.

16. The method of claim 15, where separating the data includes placing each of the packets into one of a plurality of queues.

17. A peripheral device coupled between a host device and a network, the peripheral device operable to transfer data packets from the network to the host device over a bus inside the computer system, the peripheral device comprising:

a classifying circuit operable to identify a priority level of each data packet from the network;

a first queue operable to store data packets with a first priority level from the classifying circuit;

a second queue operable to store data packets with a second priority level from the classifying circuit; and a control circuit coupled to first and second queues, the control circuit being operable to place data from the first queue onto the bus at a higher priority than data from the second queue is placed onto the bus;

where the bus is configured to receive data during time cycles of predetermined length; the control circuit being configured to place at least a minimum amount of data from the first queue onto the bus during each time cycle; the control circuit being configured to place data from the second queue onto the bus only when the bus is otherwise unoccupied by first class data.

18. A peripheral device coupled between a host device and a network, the peripheral device operable to transfer data packets from the network to the host device over a bus, the peripheral device comprising:

a classifying circuit operable to identify a priority level of each data packet from the network;

a first queue operable to store data packets with a first priority level from the classifying circuit;

a second queue operable to store data packets with a second priority level from the classifying circuit; and a control circuit coupled to the first and second queues, the control circuit being operable to place data from the first queue onto the bus at a higher priority than data from the second queue is placed onto the bus;

where the bus is a Universal Serial Bus (USB), and the first type of transfer associated with the first class is an isochronous transfer, and the second type of transfer associated with the second class is a bulk transfer.

* * * * *